US008892895B1

(12) United States Patent
Chesley et al.

(10) Patent No.: US 8,892,895 B1
(45) Date of Patent: Nov. 18, 2014

(54) INTEGRATED SYSTEM FOR ELECTRONIC TRACKING AND CONTROL OF DOCUMENTS

(75) Inventors: Jody Chesley, Brooklyn Park, MN (US); Michelle Edenborg, Minnetonka, MN (US); Mark Gedlinske, Plymouth, MN (US); Doyle Kirkeby, Chanhassen, MN (US); Shawna Maryanovich, Plymouth, MN (US); Doug Miller, Wyoming, MN (US)

(73) Assignee: Data Recognition Corporation, Maple Grove, MN (US)

( * ) Notice: Subject to any disclaimer, the term of this patent is extended or adjusted under 35 U.S.C. 154(b) by 2446 days.

(21) Appl. No.: 10/140,768

(22) Filed: May 7, 2002

(51) Int. Cl.
*H04L 9/32* (2006.01)
*G09B 7/06* (2006.01)

(52) U.S. Cl.
CPC ... *H04L 9/32* (2013.01); *G09B 7/06* (2013.01)
USPC ............ 713/179; 726/2; 726/3; 726/4; 726/5; 434/350; 434/322; 434/358; 434/362

(58) Field of Classification Search
CPC ..... H04L 9/32; H04N 2201/3233; G09B 7/06
USPC .......... 713/1, 2, 188, 194, 179; 380/200, 201, 380/255, 277; 726/2, 4–6; 434/350, 322, 434/358, 362
See application file for complete search history.

(56) References Cited

U.S. PATENT DOCUMENTS

| 4,120,049 | A | 10/1978 | Thaler et al. | 365/230 |
| 4,205,780 | A | 6/1980 | Burns et al. | |
| 4,300,123 | A | 11/1981 | McMillin et al. | |
| 4,437,838 | A | 3/1984 | Tauber et al. | 434/363 |
| 4,471,217 | A | 9/1984 | Engel | |

(Continued)

FOREIGN PATENT DOCUMENTS

| EP | 0 107 010 B1 | 3/1994 | G09G 1/16 |
| EP | 0 374 127 B1 | 4/1995 | G09G 1/16 |

(Continued)

OTHER PUBLICATIONS

Burnett, Ginny, "System and Method for Reporting Test Results", U.S. Appl. No. 10/140,770, filed May 7, 2002, 46 pgs.

(Continued)

*Primary Examiner* — Saleh Najjar
*Assistant Examiner* — Peiliang Pan
(74) *Attorney, Agent, or Firm* — Schwegman Lundberg & Woessner, P.A.

(57) ABSTRACT

Systems and methods are provided for electronic tracking and control of secure test documents. One aspect of the present subject matter is a method for management of a plurality of test documents. In one embodiment, precode data for a test-taker population is associated with secure document data for the plurality of test documents. The plurality of test documents is distributed to a test-taking center for administration to a plurality of test-takers. The plurality of test documents is received from the test-taking center after administration to the plurality of test-takers. The received plurality of test documents is verified against the distributed plurality of test documents and the precode data to account for the distributed plurality of test documents. The received plurality of test documents is processed to determine test results. The test results are reported. Other aspects are provided herein.

26 Claims, 8 Drawing Sheets

(56) References Cited

U.S. PATENT DOCUMENTS

| | | | |
|---|---|---|---|
| 4,478,584 A | 10/1984 | Kaney | 434/353 |
| 4,553,141 A | 11/1985 | Flasza et al. | |
| 4,596,468 A | 6/1986 | Simeth | |
| 4,626,892 A | 12/1986 | Nortrup et al. | |
| 4,705,479 A | 11/1987 | Maron | 434/335 |
| 4,708,503 A | 11/1987 | Poor | 400/531 |
| 4,813,077 A | 3/1989 | Woods et al. | 382/138 |
| 4,817,179 A | 3/1989 | Buck | 382/54 |
| 4,820,165 A | 4/1989 | Kanapa | 434/276 |
| 4,837,842 A | 6/1989 | Holt | 382/26 |
| 4,958,284 A | 9/1990 | Bishop et al. | |
| 4,967,354 A | 10/1990 | Buchanan | 364/419 |
| 4,978,305 A | 12/1990 | Kraft | 434/353 |
| 5,014,328 A | 5/1991 | Rudak | |
| 5,014,329 A | 5/1991 | Rudak | |
| 5,046,005 A | 9/1991 | Vilardebo et al. | 364/419 |
| 5,267,331 A | 11/1993 | Siwoff | |
| 5,321,611 A | 6/1994 | Clark et al. | 364/419.2 |
| 5,377,354 A | 12/1994 | Scannell et al. | |
| 5,386,482 A | 1/1995 | Basso et al. | 382/9 |
| 5,433,615 A | 7/1995 | Clark | 434/322 |
| 5,437,554 A | 8/1995 | Clark et al. | 434/322 |
| 5,445,369 A | 8/1995 | Golicz et al. | 271/3.23 |
| 5,452,379 A | 9/1995 | Poor | 382/317 |
| 5,458,493 A | 10/1995 | Clark et al. | 434/322 |
| 5,466,159 A | 11/1995 | Clark et al. | 434/322 |
| 5,509,064 A * | 4/1996 | Welner et al. | 379/265.02 |
| 5,513,994 A * | 5/1996 | Kershaw et al. | 434/350 |
| 5,531,429 A | 7/1996 | Clark | 270/58.11 |
| 5,556,282 A | 9/1996 | Middlebrook | |
| 5,558,521 A | 9/1996 | Clark et al. | 434/322 |
| 5,672,060 A | 9/1997 | Poor | 434/322 |
| 5,690,497 A | 11/1997 | Clark et al. | 434/322 |
| 5,709,551 A | 1/1998 | Clark et al. | 434/322 |
| 5,716,213 A | 2/1998 | Clark et al. | 434/322 |
| 5,718,591 A | 2/1998 | Clark et al. | 434/322 |
| 5,735,694 A | 4/1998 | Clark et al. | 434/322 |
| 5,752,836 A | 5/1998 | Clark et al. | 434/322 |
| 5,775,918 A | 7/1998 | Yanagida et al. | |
| 5,827,070 A | 10/1998 | Kershaw et al. | |
| 5,879,165 A | 3/1999 | Brunkow et al. | |
| 5,947,747 A | 9/1999 | Walker et al. | |
| 5,949,551 A | 9/1999 | Miller et al. | |
| 5,987,149 A | 11/1999 | Poor | 382/100 |
| 5,987,302 A | 11/1999 | Driscoll et al. | |
| 5,991,595 A | 11/1999 | Romano et al. | 434/353 |
| 6,035,058 A | 3/2000 | Savakis et al. | |
| 6,042,384 A | 3/2000 | Loiacono | |
| 6,109,522 A | 8/2000 | Force et al. | |
| 6,120,299 A | 9/2000 | Trenholm et al. | 434/323 |
| 6,155,839 A | 12/2000 | Clark et al. | 434/322 |
| 6,159,018 A | 12/2000 | Clark et al. | 434/322 |
| 6,168,440 B1 | 1/2001 | Clark et al. | 434/322 |
| 6,173,154 B1 | 1/2001 | Kucinski et al. | 434/353 |
| 6,178,308 B1 * | 1/2001 | Bobrow et al. | 434/350 |
| 6,181,909 B1 | 1/2001 | Burstein et al. | 434/353 |
| 6,183,260 B1 | 2/2001 | Clark et al. | 434/322 |
| 6,183,261 B1 | 2/2001 | Clark et al. | 434/322 |
| 6,193,521 B1 | 2/2001 | Clark et al. | 434/322 |
| 6,212,130 B1 | 4/2001 | Brazeal, Jr. et al. | 367/93 |
| 6,234,806 B1 | 5/2001 | Trenholm et al. | 434/322 |
| 6,256,399 B1 | 7/2001 | Poor | 382/100 |
| 6,267,601 B1 | 7/2001 | Jongsma et al. | 434/362 |
| 6,311,040 B1 | 10/2001 | Kucinski et al. | |
| 6,366,759 B1 | 4/2002 | Burstein et al. | 434/353 |
| 6,366,760 B1 | 4/2002 | Kucinski et al. | |
| 6,386,883 B2 | 5/2002 | Siefert | |
| 6,498,920 B1 | 12/2002 | Simon | |
| 6,505,031 B1 | 1/2003 | Slider et al. | 434/350 |
| 6,577,846 B2 * | 6/2003 | Poor | 434/353 |
| RE38,275 E | 10/2003 | Ruppert | |
| 6,650,793 B1 | 11/2003 | Lund et al. | |
| 6,651,081 B1 | 11/2003 | Salgado et al. | |
| 6,684,052 B2 | 1/2004 | Kucinski et al. | |
| 6,741,967 B1 | 5/2004 | Wu et al. | |
| 6,751,351 B2 | 6/2004 | Knowles et al. | |
| 6,772,081 B1 | 8/2004 | Gedlinske et al. | 702/108 |
| 6,816,702 B2 | 11/2004 | Kuntz et al. | |
| 6,879,805 B2 | 4/2005 | Epstein | |
| 6,925,601 B2 | 8/2005 | Moore et al. | |
| 6,938,048 B1 | 8/2005 | Jilk et al. | |
| 7,035,748 B2 | 4/2006 | Gedlinske et al. | |
| 7,099,620 B2 | 8/2006 | Miller | |
| 7,207,804 B2 | 4/2007 | Hersh | |
| 7,286,793 B1 | 10/2007 | Miele | |
| 7,352,990 B2 | 4/2008 | Ikezawa et al. | |
| 7,406,392 B2 | 7/2008 | Gedlinske et al. | |
| 7,881,898 B2 | 2/2011 | Gedlinske et al. | |
| 8,385,811 B1 | 2/2013 | Gedlinske et al. | |
| 2001/0031457 A1 | 10/2001 | Pfenninger et al. | |
| 2002/0110797 A1 | 8/2002 | Poor | |
| 2002/0110798 A1 | 8/2002 | Kucinski et al. | |
| 2002/0155419 A1 | 10/2002 | Banerjee et al. | |
| 2002/0172931 A1 | 11/2002 | Greene et al. | |
| 2002/0178244 A1 | 11/2002 | Brittenham et al. | 709/223 |
| 2002/0180770 A1 * | 12/2002 | Sirhall | 345/700 |
| 2002/0182578 A1 | 12/2002 | Rachman et al. | |
| 2002/0186222 A1 | 12/2002 | Morton et al. | |
| 2003/0180703 A1 | 9/2003 | Yates et al. | |
| 2004/0067478 A1 | 4/2004 | Epstein | |
| 2004/0126036 A1 | 7/2004 | Poor | |
| 2004/0267500 A1 | 12/2004 | Gedlinske et al. | |
| 2006/0265170 A1 | 11/2006 | Gedlinske et al. | |
| 2009/0011396 A1 | 1/2009 | Gedlinske et al. | |

FOREIGN PATENT DOCUMENTS

| | | | | |
|---|---|---|---|---|
| EP | 0 374 892 B1 | 4/1997 | | G06F 7/30 |
| WO | WO-90/04004 | 4/1990 | | C09D 11/00 |
| WO | WO-91/09734 | 7/1991 | | B32B 33/00 |

OTHER PUBLICATIONS

Chesley, Jody , "System for Generation of Statistical Examination Reports", U.S. Appl. No. 10/153.562, filed May 21, 2002, 53 pgs.

Chesley, Jody , "System for Programmable Presentment of Scoring Tasks to a Plurality of Reviewers", U.S. Appl. No. 10/140,769, filed May 7, 2002, 40 pgs.

Gedlinske, Mark , "Priority System and Method for Processing Standardized Tests", U.S. Appl. No. 10/894,560, filed Jul. 20, 2004, 52 pgs.

Gedlinske, Mark , "System and Method for Processing Forms Using Color", U.S. Appl. No. 10/364,758, filed Feb. 11, 2003, 39 pgs.

Gedlinske, Mark , "System for Online Enrollment of Testing Candidates", U.S. Appl. No. 10/328,429, filed Dec. 23, 2002, 36 pgs.

""Score Image" Processing of Constructed-Responses, Essays, and Writing Samples", *UNISCORE, Incorporated*, (1992),3 pgs.

"Image Processing of Open-Ended Questions", *UNISCORE, Incorporated*, (1992),4 pgs.

Anderson, Jonathan , "The Role of the Computer in Assessment: Recent Developments in Australia [Journal Paper]" *Journal of Educational Processing*, vol. 10, No. 1-2 USA, (1973),4-11.

Brown, Peter , et al., "Validation: Cost effective external evaluation", *Australian Journal of Education Technology*, 6(2), (1990),1-6.

Cason, Gerald J., et al., "Integrated Test Scoring, Performance Rating and Assessment Records Keeping", *Innovations in Medical Education, Association of American Medical Colleges*, Washington, D.C.., Paper presented at the annual meeting of the Association of Medical Colleges.,(Nov. 1, 1987),2-20.

Epstein, Marion G., "Computer Assisted Assembly of Tests at Educational Testing Service", *Educational Technology*, (Mar. 1, 1973),23-24.

Feldker, Paul , "Online Computer Testing with Networked Apple II Microcomputers [Conference Paper]", *Conference on Computers in Physics Instruction. Proceedings. Addison-Wesley*. Redwood City, CA, USA, (1990),510-511.

Foxon, Marguerite , "Evaluation of training and development programs: A review of the literature", *Australian Journal of Educational Technology*, 5 (2), (1989),1-16.

(56) References Cited

OTHER PUBLICATIONS

Garris, Michael D., et al., "NIST Scoring Package User's Guide Release 1.0", *NTIS, U.S. Department of Commerce, Technology Administration, National Institute of Standards and Technology*, Oct. 1992, NISTIR 4950,76 pgs.

Gathy, P, et al., "Computer-Assisted Self-Assessment (CASA) in Histology", *Computers Education.*, vol. 17, No. 2., (1991),109-116.

Higgins, Colin A., et al., "Note-pad computers and the concept of Electronic Paper", *Information Services and Use*, vol. 11., (1991),179-192.

Martz, Richard J., "Building the Computer Graphics Laboratory at Educational Testing Service [Conference Paper]", *Proceedings of NCGA's Computer Graphics 1987 Annual Conference and Exposition. Nat. Comput. Graphics Assoc.* 1987, vol. III. Fairfax, VA, USA, Princeton, NJ 18541, 194.

Meredith, Joseph C., et al., "Student Feedback assisted instruction (CAI) frame development", *Scientia Paedagogica Experiments*, vol. 7 (2),, (1970),221-302.

Mizokawa, Donald T., et al., "Guidelines for Computer-Managed Testing", *Educational Technology*, Dec. 1984, 12-17.

Neuburger, Wayne F., "A Computer Support System for a Teacher Evaluation Model", *Paper presented at the National Association of Users of Computer Applications to Learning Conference*, (Oct. 28, 1976),2-16.

Orthner, Ph.D, Helmuth F., "Computer Systems in Medical Education", *Proceedings, The Sixth Annual Symposium on Computer Applications in Medical Care*, George Washington University Medical Center, (1982),1008-1010.

Pittman, James A., "Recognizing Handwritten Text [Conference Paper]", *Human Factors in Computing Systems. Reaching Through Technology. Conference Proceeding. ACM.* 1991, New York, NY, USA., 271-275.

Reid-Green, Keith S., "A High Speed Image Processing System [Journal Paper]", *IMC Journal*, vol. 26, No. 2, Mar.-Apr. USA, (1990),12-14.

Sims, Rod, "Futures for computer-based training: Developing the learner-computer interface", *Australian Journal of Educational Technology*, 4(2),, (1988),1-11.

Sunouchi, Haruo et al., "Computer-Assisted Retrieval and Analysis for Educational Test Items", *3rd USA-Japan Computer Conference, Waseda University, School of Science and Engineering*, Tokyo, Japan, (1978),198-202.

Thompson, John M., et al., "Educational Testing Service, Where the business of graphics is analysis", *Computer Graphics World*, Dec. 1986,57-61.

Zuckerman, Ronald A., "Optical Scanning for Data Collection, Conversion & Reduction", *NTIS, U.S. Department of Commerce, National Technical Information Service*, August, Springfield, VA, USA, (1967),49 pgs.

Ateya, A., "Drop-Out Colors", RIT Research Corporation, (Sep. 1999), 8 pgs.

Housman, Coy C., et al., "Constructed Response Scoring System", U.S. Appl. No. 60/384,440, filed May 31, 2002, 161 pgs.

Housman, Coy C., et al., "Constructed Response Scoring System", U.S. Appl. No. 60/387,100, filed Jun. 7, 2002, 22 pgs.

"U.S. Appl. No. 12/465,842, Advisory Action mailed Jun. 28, 2010", 4 pgs.

"U.S. Appl. No. 12/465,842, Notice of Allowance mailed Oct. 23, 2012", 7 pgs.

"U.S. Appl. No. 12/465,842, Supplemental Preliminary Amendment mailed Aug. 27, 2009", 3 pgs.

"U.S. Appl. No. 12/555,673, Supplemental Preliminary Amendment mailed Dec. 23, 2009", 7 pgs.

"U.S. Appl. No. 12/749,881 , Response filed Jun. 5, 2013 to Final Office Action mailed Mar. 5, 2013", 8 pgs.

"U.S. Appl. No. 13/283,089, Advisory Action mailed Jun. 28, 2013", 3 pgs.

"U.S. Appl. No. 13/283,089, Final Office Action mailed Mar. 5, 2013", 23 pgs.

\* cited by examiner

INTEGRATED SYSTEM FOR ELECTRONIC TRACKING AND CONTROL OF DOCUMENTS

CROSS REFERENCE TO RELATED APPLICATIONS

This application is related to the following commonly assigned U.S. patent applications which are herein incorporated by reference in their entirety: "System For Programmable Presentment Of Scoring Tasks To A Plurality Of Reviewers," U.S. Ser. No. 10/140,769, filed on May 7, 2002; "Systems for Generation of Statistical Examination Reports," U.S. Ser. No. 10/153,562, filed on Feb. 21, 2002; and "System and Method for Reporting Test Results," U.S. Ser. No. 10/140,770, filed on May 7, 2002. This application also is related to the following commonly assigned U.S. patent applications: "Priority System and Method for Processing Standardized Tests," U.S. Ser. No. 10/153,444, filed on May 21, 2002; "System and Method for Processing Forms Using Color," U.S. Ser. No. 10/334,758, filed on Feb. 11, 2003; and "System For On-Line Enrollment Of Testing Candidates," U.S. Ser. No. 10/328,429, filed on Dec. 23, 2002.

TECHNICAL FIELD

This application relates generally to systems and methods for electronic tracking and control of documents and, more particularly to electronic tracking and control of standardized tests within a standardized test management system.

BACKGROUND

One method for evaluating the knowledge or skill of a person includes the use of standardized tests. For example, standardized tests are used to monitor the academic progress of students. Some standardized tests incorporate objective test questions that are answered by filling in an appropriate oval in an associated bubble-type answer sheet using a pencil. Some standardized tests include open-ended questions or tests. Examples of open-ended questions in these tests include essay questions, fill-in-the-blank questions, fill-in-the-map questions, math questions, and motor skill tests in which a test taker draws geometric shapes. Open-ended questions or tests, also referred to herein as scoring tasks or test items, are evaluated and scored by a human reviewer, also referred to herein as a reader.

Standardized tests are distributed from test processing centers to test-taking centers where the tests are administered to test-takers. One example of a test-taker is a student. Another example of a test-taker is a student who is taking home-based assessments.

In order to promote the integrity and accuracy of the administered tests and the test results, it is desirable to limit access to certain standardized test documents. It is also desirable to quickly identify when a secure test document has not been accounted for as being within a controlled location to promote quick resolutions for potential problems and to promote quicker test evaluations and reporting of the test results.

There is a need in the art to provide improved systems and methods for standardized test management that improves the tracking of secure test documents and the processing of the test documents.

SUMMARY

The above mentioned problems are addressed by the present subject matter and will be understood by reading and studying the following specification. The present subject matter relates to a system for electronic tracking and control of secure test documents. The present subject matter promotes the efficiency and integrity of processes for evaluating standardized tests and reporting standardized test results. A verification process quickly determines whether a potential problem exists regarding a secure document. Test documents that are not verified are associated with test-taker data to provide meaningful information that is helpful to resolve the potential problems with the secure test documents.

One aspect of the present subject matter is a method for management of a plurality of standardized test documents. In one embodiment, precode data for a test-taker population is associated with secure document data for the plurality of standardized test documents. The reception of the plurality of standardized test documents is verified against a distributed plurality of standardized test documents and the precode data to account for the distributed plurality of standardized test documents.

One aspect provides a method for receiving a plurality of standardized test documents from a test-taking center. According to one embodiment, one or more boxes (or other shipping container) that contain the plurality of standardized test documents are received from the test-taking center. The one or more received boxes are processed to verify that the one or more received boxes correspond to one or more shipped boxes sent from the test-taking center. The plurality of standardized test documents contained within the one or more received boxes are processed.

One aspect provides a standardized test management system. According to one embodiment, the system includes a server and one or more scanners connected to the server for reading at least one identifier label on the secured documents and capturing test images of the secured documents. The server includes a database module for associating secure document data with test-taker data. The server further includes an on-line enrollment module for a test administrator to populate test-taker data through on-line communication. The server further includes a verification module for verifying received secure documents against distributed secure documents and the populated test-taker data. The server further includes a reporting module for reporting verification results from the verification module.

These and other aspects, embodiments, advantages, and features will become apparent from the following description and the referenced drawings.

DETAILED DESCRIPTION

Figure 1:
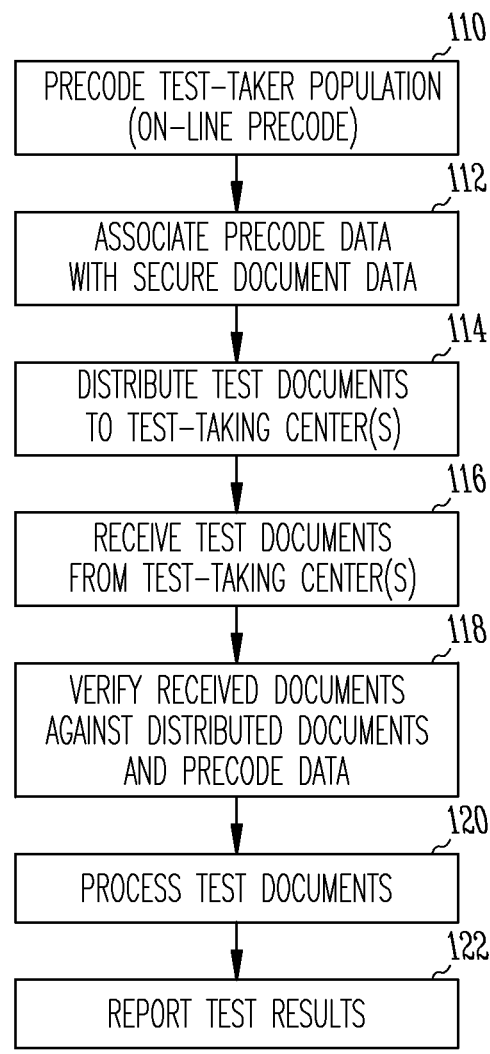
FIG. 1 illustrates one embodiment for management of a plurality of standardized test documents.

The following detailed description refers to the accompanying drawings which show, by way of illustration, specific aspects and embodiments in which the present subject matter may be practiced. In the drawings, like numerals describe substantially similar components throughout the several views. These embodiments are described in sufficient detail to enable those skilled in the art to practice the present subject matter. Other embodiments may be utilized and structural, logical, and electrical changes may be made without departing from the scope of the present subject matter. The following detailed description is, therefore, not to be taken in a limiting sense, and the scope of the present subject matter is defined only by the appended claims, along with the full scope of equivalents to which such claims are entitled.

The present subject matter provides systems and methods for improving standardized test management. One aspect improves the tracking of secure test documents. A verification process quickly determines whether a potential problem exists regarding a secure document. The verification process, for example, compares the actual received test documents against the shipped documents to verify that the documents that have been identified as being shipped have been received. Test documents that are not verified are associated with test-taker data to provide meaningful information that is helpful to resolve the potential problem with the secure test documents. One aspect improves the processing of the test documents through improved processes for receiving and identifying test documents.

FIG. 1 illustrates one embodiment for management of a plurality of standardized test documents. According to this embodiment, a test-taker population is precoded at 110. One example of a test-taker population includes students within a state or district who are required to take a standardize test. According to various embodiments, precode data includes student information such as name, age, education level, class, school and other information deemed relevant for reporting purposes. In one embodiment, precode data further includes information regarding test requirements for individual test-takers. Examples of test requirements include, but are not limited to, the need for Braille or large print tests for individual test-takers. In one embodiment for managing a plurality of standardized test documents, the test-taker population is precoded through an on-line precode process as provided in the copending, commonly-assigned application entitled "System For On-Line Enrollment Of Testing Candidates," U.S. Ser. No. 10/328,429, filed on Dec. 23, 2002.

The precode data is associated with secure document data at 112. The secure document data includes a unique security identifier for each secure test document in the plurality of standardized test documents. In one embodiment, the unique identifier is a security number. In one embodiment, each secure test document is labeled with a bar code that represents the unique security identifier. The use of the bar code allows the secure test document to be quickly identified using hand-held scanners and/or scanning stations, for example. Thus, the physical location and the status of each of the secure test documents is able to be determined as the secure test documents are transported through various stages of receiving, processing and archiving.

As will be apparent to one of ordinary skill in the art upon reading and comprehending this disclosure, associating the precode data with the secure document data allows each of the secure test documents to be associated with the test-taker population. One advantage of associating secure test documents with the test-taker population is that the association encourages or promotes quick resolution of discrepancies between a recorded location of a secure test document and an actual location of a secure test document. For example, a discrepancy for a particular test administered to a particular student is reported to a school with tracking and other information to improve the likelihood of resolving the discrepancy. In this scenario, for example, it may be determined that a particular student completed the secure test document, but that the secure test document was not shipped from the test-taking center or received at the test processing center. Thus, it may be determined that the discrepancy is attributable to a failure to send the completed test document back to the test processing center.

At 114, test documents are distributed to the test-taking centers, where the tests are administered to test-takers. After the tests are administered to the test-takers, the test documents are sent back from the test-taking centers and are received at the test processing center at 116. In one embodiment, the received test documents are verified against the distributed documents and the precode data at 118. This verification provides an early detection of a discrepancy between a distributed test document and the received test document, and encourages a quick resolution of the discrepancy by identifying the people most likely capable of resolving the situation through appropriate reporting of information concerning the discrepancy. The test documents are processed at 120 to determine test results. The test results are reported to the appropriate parties at 122.

Figure 2:
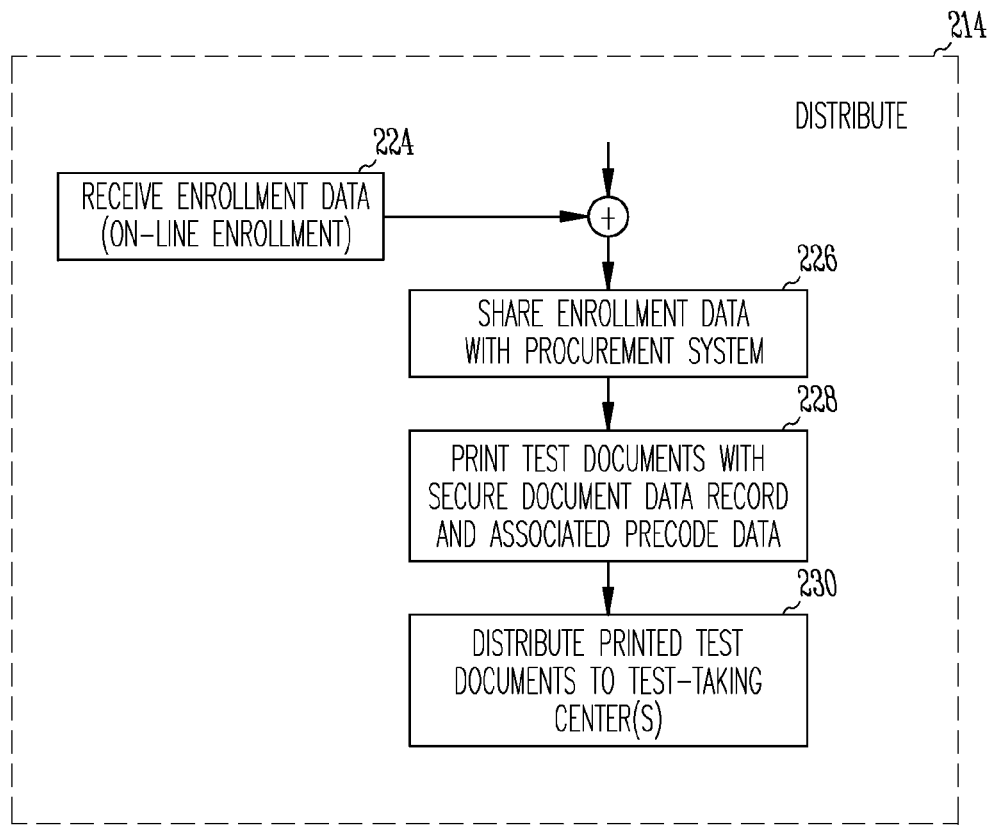
FIG. 2 illustrates one embodiment for distributing test documents to test-taking centers as shown within the method of FIG. 1.

FIG. 2 illustrates one embodiment for distributing test documents to test-taking centers as shown at 114 within the method of FIG. 1. In this embodiment 214, enrollment data is received at 224. Enrollment data includes, but is not limited to, the quantities and types of tests to be administered at various test-taking centers. By way of example only, a school district may enroll 300 eighth grade students to take an eighth grade standardized test. Of the 300 eighth grade tests needed, 3 of the eighth grade tests may need to be written in Braille and 5 may need to be written in large print. This enrollment information is used to determine the quantity and type of tests to be distributed to the test-taking center. According to one embodiment, the enrollment information is received on-line from the test-taking center as provided in the copending, commonly-assigned application entitled "System For On-Line Enrollment Of Testing Candidates," U.S. Ser. No. 10/328,429, filed on Dec. 23, 2002. One of ordinary skill in the art will understand, upon reading and comprehending this disclosure, that element 224 shown in FIG. 2 can occur either before or after element 110 or before or after element 112 shown in FIG. 1.

One embodiment shares the enrollment data with a procurement system through computer readable media/medium at 226 so that the system can automatically, or near automatically, order the materials required to assemble the quantities and types of test documents provided by the enrollment data. At 228, the test documents are printed (and assembled) with an appropriate secure document data record and with associated precode data. The precode data was previously associated with the secure document data at 112 in FIG. 1, for example. Thus, the system is capable of printing secure document data and appropriate precode data (such as school data, class data, student data and the like) on the test documents. At 230, the printed test documents (including the secure document data and the associated precode data) are distributed to the test-taking center.

Figure 3:
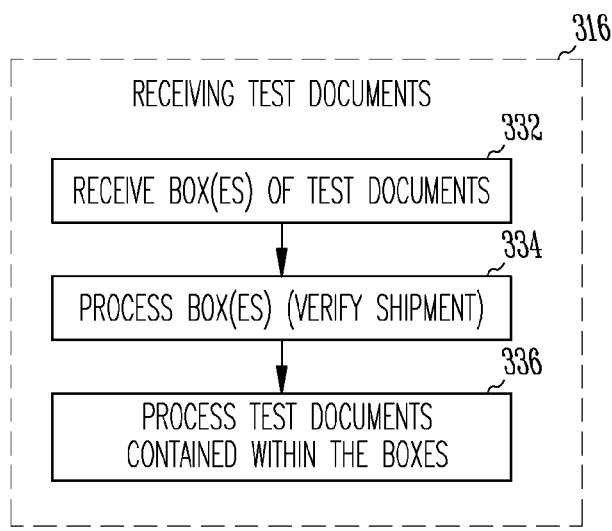
FIG. 3 illustrates one embodiment for receiving test documents from test-taking centers as shown within the method of FIG. 1.

FIG. 3 illustrates one embodiment for receiving test documents from test-taking centers as shown at 116 within the method of FIG. 1. In this embodiment 316, one or more boxes of test documents sent from the test-taking centers are received at the test processing center at 332. The term box, as used herein, includes various containers that are capable of being used to ship and receive the test documents. The term box is used to simplify the disclosure by using a well-known, easily-visualized shipping container. One of ordinary skill in the art will understand, upon reading and comprehending this disclosure and the attached claims, that the present subject matter is not limited to boxes or to any other type of shipping container, and that the term box as used in the claims is entitled to be interpreted as encompassing a full scope of equivalent shipping containers.

The received box(es) are processed at 334. In one embodiment, processing the received box(es) includes verifying that box(es) received at the test processing center correspond to the boxes shipped from the test-taking centers. According to various embodiments, the verification process uses a variety of information sources including, among other things, documentation shipped with the boxes, courier tracking data, and/or information provided through an on-line update from the test-taking centers identifying the boxes that had been shipped.

Figure 4:
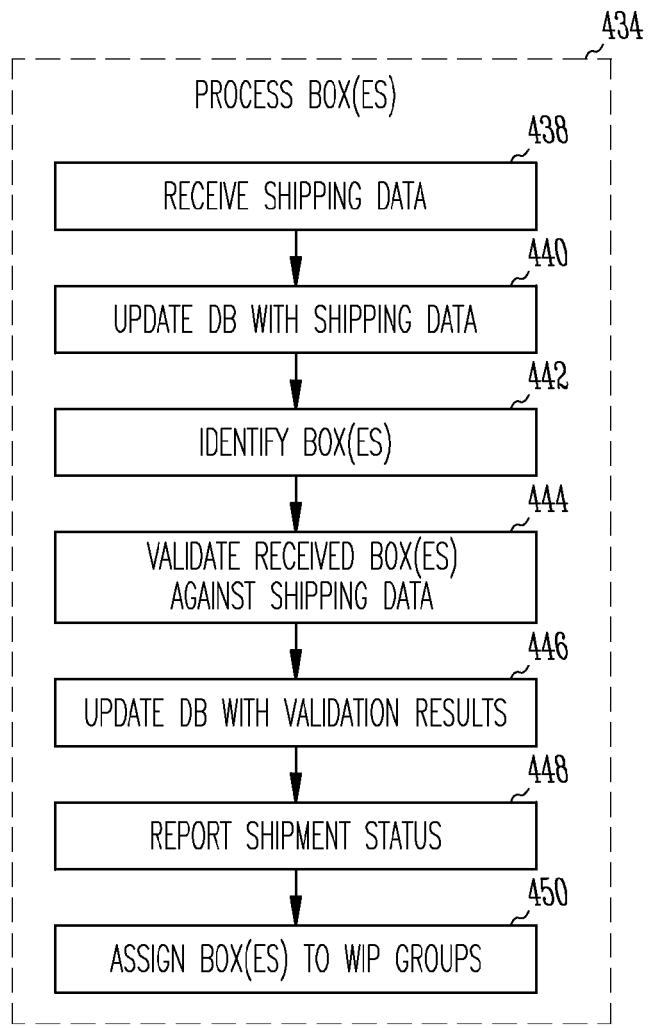
FIG. 4 illustrates one embodiment for processing box(es) as shown within the method of FIG. 3.

FIG. 4 illustrates one embodiment for processing box(es) as shown at 334 within the method of FIG. 3. According to this embodiment 434, shipping data is received at 438. According to various embodiments, this shipping data is taken from, for example, documentation shipped with the boxes, courier tracking data, and/or information provided through an on-line update from the test-taking centers identifying the boxes that had been shipped. A database is updated with the received shipping data at 440.

The received boxes are identified at 442, and are validated against the received shipping data at 444. One validation method involves counting the shipped boxes and the received boxes, and verifying that the number of shipped and received boxes are the same. One validation method involves labeling each of the shipped boxes with a unique identifier, and using the unique identifier to verify that a shipped box was received. According to one embodiment, the boxes are labeled with bar codes that represent a unique box identifier.

The database is updated with the validation results at 446. This information is used to indicate discrepancies; that is, to indicate whether the one or more shipped boxes sent from the test-taking center have been received at the test processing center. At 448, the shipment status of the shipped and received boxes is reported to the appropriate people for detecting and resolving discrepancies.

At 450, the boxes are assigned to Work-In-Progress (WIP) groups for further processing. According to one embodiment, the boxes of test documents are assigned to labeled pallets, which form the WIP groups. In one embodiment, the pallets are labeled with bar codes that represent unique pallet identifiers.

Figure 5:
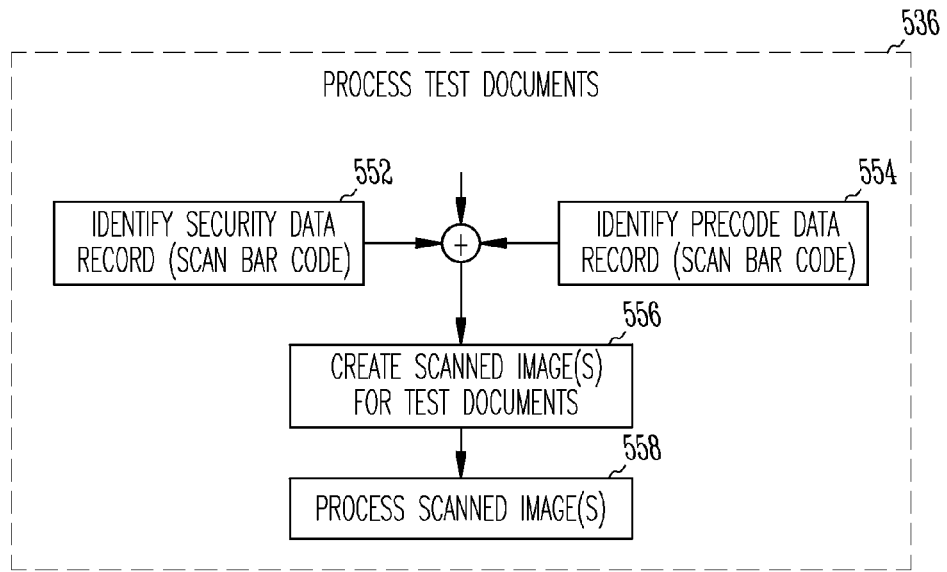
FIG. 5 illustrates one embodiment for processing test documents as shown within the method of FIG. 3.

FIG. 5 illustrates one embodiment for processing test documents as shown at 336 within the method of FIG. 3. In this embodiment 536, a security data record is identified for each of the test documents being processed at 552, and a precode data record, if available, is identified for each of the test documents being processed at 554. In various embodiments, the security data record and/or the precode data record are/is identified by reading a bar code.

A precode data record may not always be present on a received test document because test-takers can move, for example, or can otherwise be added or deleted. In one embodiment, if a test-taker does not receive a test document with precode data, the test-taker completes one of a number of "extra" test documents that are distributed to the test-taking center along with the precoded test documents. Each of these extra test documents include a unique secure test document identifier. A bar code or other marking indicates that a completed test document is not precoded, and thus needs to be processed to determine the student information that is to be associated with the secure document. In one embodiment, a test administrator from the test-taking center updates the test-taker population data with information identifying whether a test-taker completed a test document, and providing information for those test-takers who were not accounted for in the precode data.

As used herein, open-ended scoring tasks involve scoring open-ended questions using a reader, and objective scoring tasks involve scoring questions using a computer system using OMR logic, for example. One example of an objective scoring task is a multiple choice question. That is, an objective scoring task involves a scoring task that is particularly well-suited or intended to be scored by a computer and an open-ended scoring task involves a scoring task that is well-suited or intended to be scored by a reader. However, it is noted that computers are able to score open-ended scoring tasks by reading handwriting and applying artificial intelligence. Even so, one of ordinary skill in the art will understand, upon reading and comprehending this disclosure, objective and open-ended scoring tasks.

At 556, one or more scanned images for each of the received test documents are created. The scanned image(s) of the test documents are processed at 558. In one embodiment, the scanned image(s) are processed using various image processing software and/or filters to score objective scoring tasks. In one embodiment, the scanned image(s) are processed using various image processing software and/or filters to score open-ended scoring tasks. In one embodiment, the scanned image(s) are processed using various image processing software and/or filters to score both objective and open-ended scoring tasks. In one embodiment, the open-ended scoring tasks are processed using artificial intelligence in a computer-based process. For example, handwritten answers are capable of being detected and deciphered into an answer, and artificial intelligence is applied to the answer to score the test item.

Figure 6:
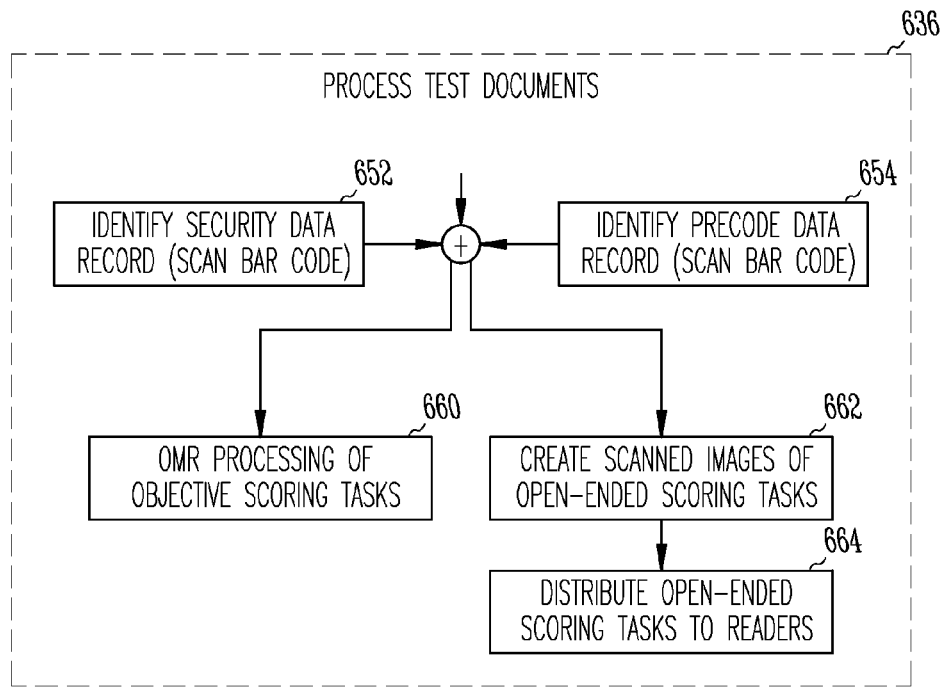
FIG. 6 illustrates one embodiment for processing test documents as shown within the method of FIG. 3.

FIG. 6 illustrates one embodiment for processing test documents as shown at 336 within the method of FIG. 3. In this embodiment 636, a security data record is identified for each of the test documents being processed at 652, and a precode data record, if available, is identified for each of the test documents being processed at 654. In various embodiments, the security data record and/or the precode data record are/is identified by reading a bar code.

In the illustrated embodiment, an optical mark recognition (OMR) process is used to process objective scoring tasks at 660. An OMR process is capable of detecting ovals or circles that have been filled in using a carbon-based pencil, for example. In one embodiment, the OMR process uses a carbon filter to identify the position of the marks on the test document.

In the illustrated embodiment, scanned images of open-ended scoring tasks are created at 662. Examples of open-ended questions in these tests include an essay questions, fill-in-the-blank questions, fill-in-the-map questions, math questions, and motor skill tests in which a test taker draws geometric shapes, for example. The open-ended scoring tasks are distributed to human readers at 664. In one embodiment, the open-ended scoring tasks are distributed to human readers using a dealer system provided in the patent application entitled "System For Programmable Presentment Of Scoring Tasks To A Plurality Of Reviewers," U.S. Ser. No. 10/140, 769, filed on May 7, 2002, which has been previously incorporated by reference in its entirety. One aspect of one embodiment of the dealer system involves, among other things, distributing the open-ended scoring tasks to readers based on a project-determined priority.

Figure 7:
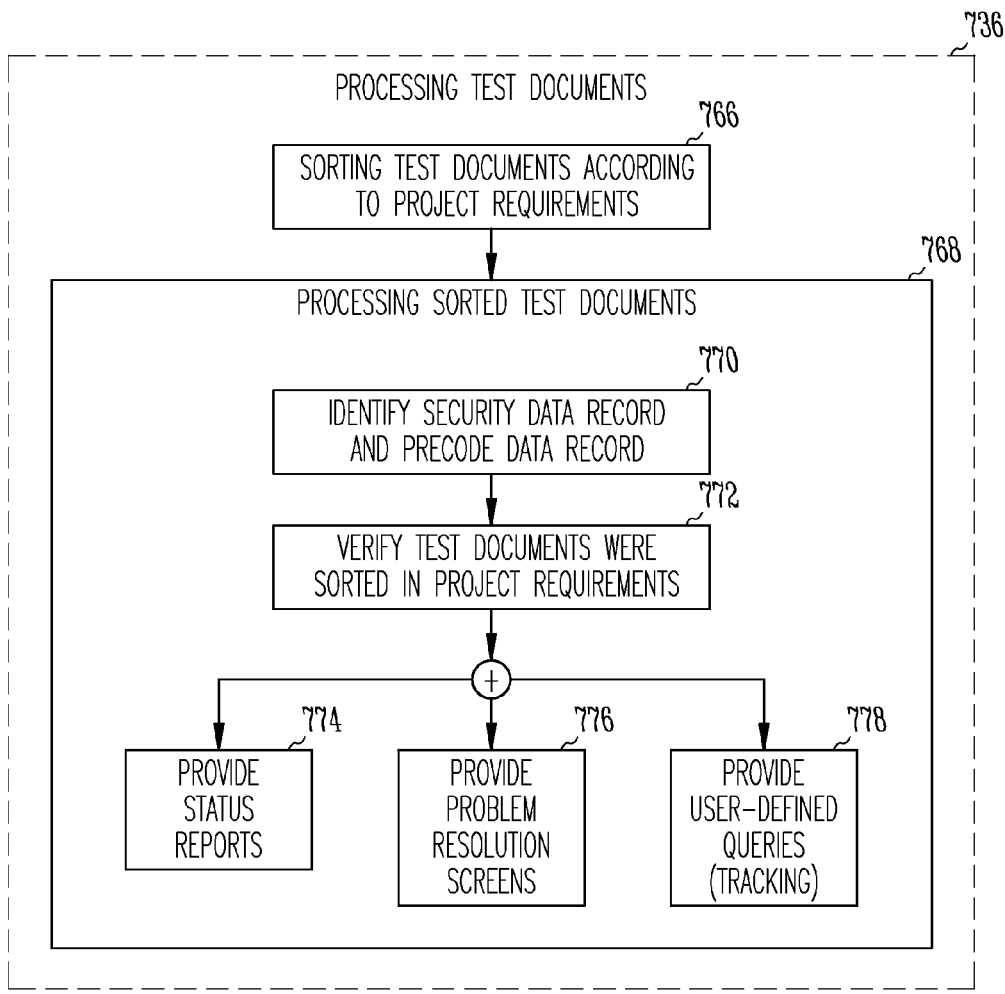
FIG. 7 illustrates one embodiment for processing test documents as shown within the method of FIG. 3.

FIG. 7 illustrates one embodiment for processing test documents as shown at 336 within the method of FIG. 3. In this embodiment 736, received test documents are sorted according to project requirements at 766, and the sorted test documents are processed at 768. In one embodiment, the received test documents are sorted into boxes (or reboxed) with like or similar test documents. In one embodiment, processing sorted test documents includes identifying a security data record and a precode data record as illustrated at 770, and at 772, verifying that the test documents were sorted to the project requirements.

In one embodiment, as illustrated at 774, processing the sorted plurality of standardized test documents includes providing a report for showing a status of the plurality of test documents contained in the received box(es). According to one embodiment, the status reports include verification information as to whether the test documents were sorted to project requirements. In one embodiment, as illustrated at 776, processing the sorted plurality of standardized test documents includes providing problem resolution screens. These problem resolution screens, for example, step a person through various decisions and/or actions and provide the user with options for resolving the discrepancies. In one embodiment, the problem resolution screens provide some of the more likely solution possibilities first before providing other solution possibilities. Examples of discrepancies include documents that were not sorted to project requirements as represented at 772, and received documents that do not match the distributed documents, or distributed documents that do not match the received documents as represented at 118 in FIG. 1. In one embodiment, as illustrated at 778, processing the sorted plurality of standardized test documents includes providing user-defined queries. One embodiment includes queries for tracking the secure test documents throughout processing.

Figure 8A:
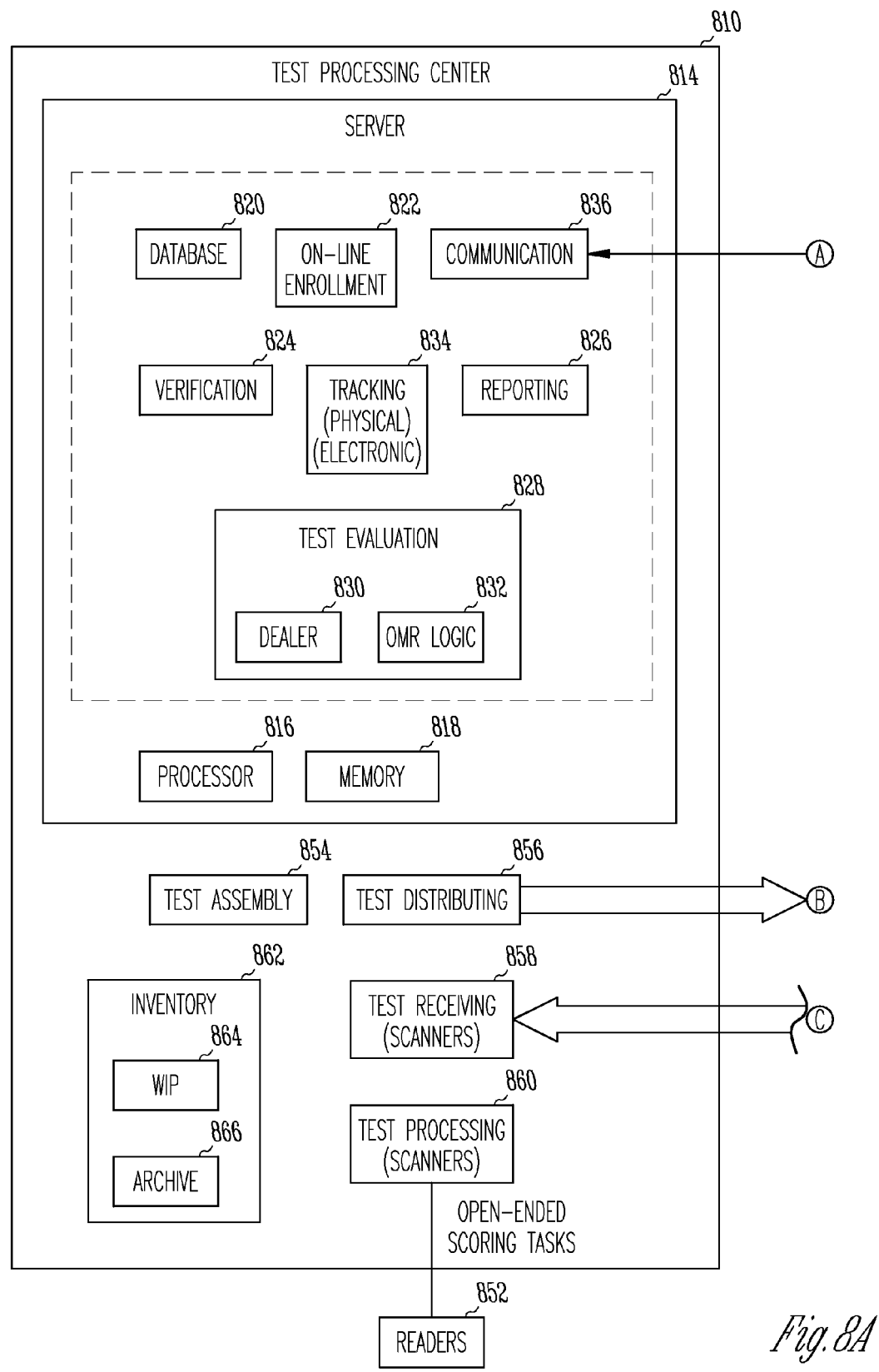
FIG. 8 illustrates one embodiment of a standardized test management system.
Figure 8B:
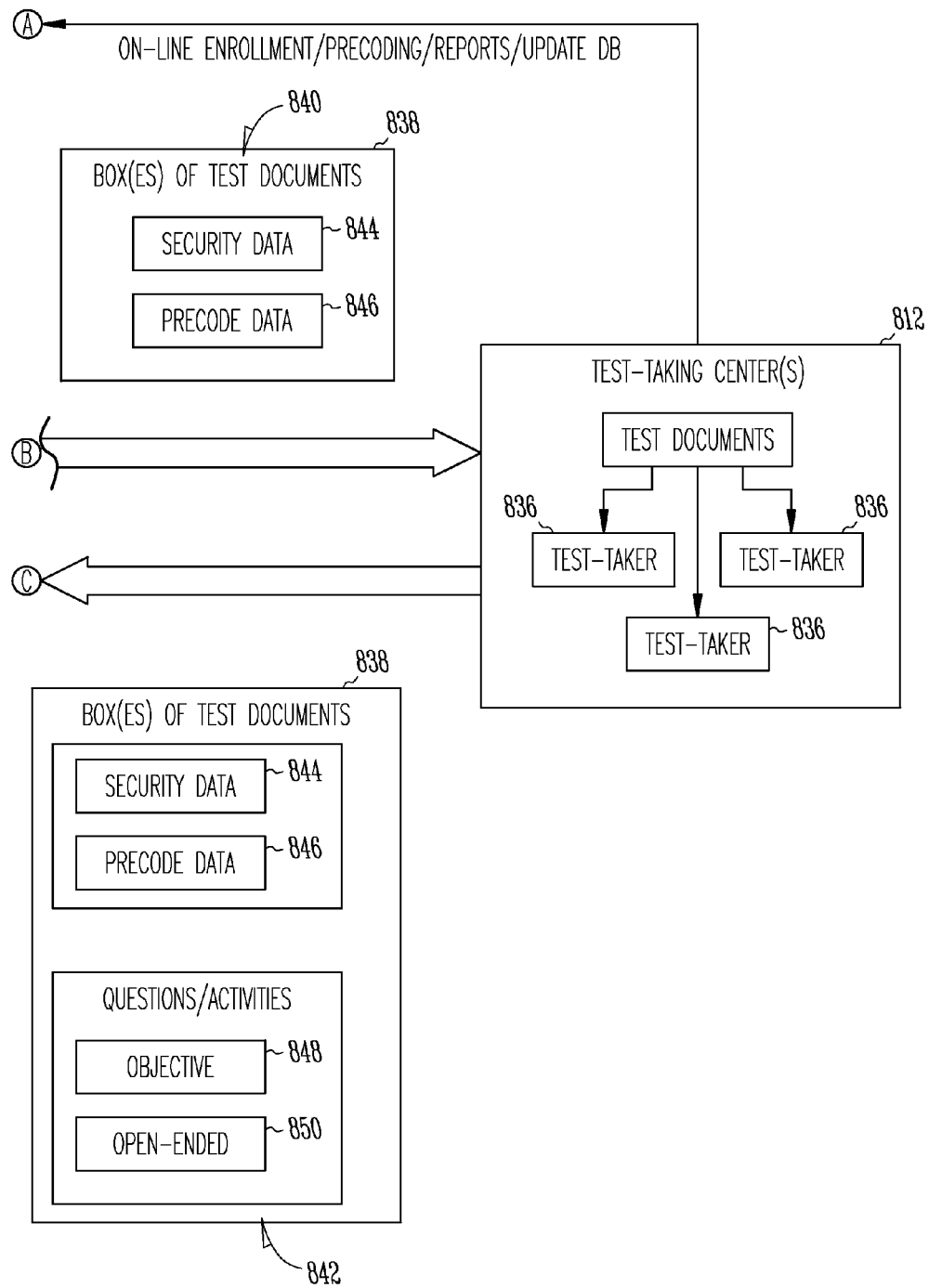

FIG. 8 illustrates one embodiment of a standardized test management system. The figure illustrates a test processing center 810 where standardized tests are assembled, distributed to test-taking centers, collected from test-taking centers and processed, and further illustrates a test-taking center 812 where the standardized test are completed by test-takers. One of ordinary skill in the art will understand, upon reading and comprehending this disclosure, that the illustrated test processing center encompasses one or more physical test processing centers, and that the illustrated test-taking center encompasses one or more physical test-taking centers.

According to one embodiment, the tests are distributed and received via parcel post or other courier service. The test documents are shipped in boxes 838 or other shipping containers. A number of the distributed test documents 840 are identified with security data 844 and precode data 846. The received test documents 842 may or may not be shipped in the same boxes in which they were distributed. In one embodiment, the boxes are labeled with a unique identifiers, such as a bar code. In addition to the security data 844 and the precode data 846, the received test documents 842 include completed objective questions/activities 848 and/or completed open-ended questions/activities 850.

In one embodiment, the tests are distributed and received via a communication channel, such as through the Internet global network. In one embodiment, test-takers 836 complete the test on-line through a communication channel. One of ordinary skill in the art will understand, upon reading and comprehending this disclosure, that in various embodiments, the test processing center 810 includes one or more physical sites and the test-taking centers 812 include one or more physical site(s).

The illustrated test processing center 810 includes a server 814 that includes a processor 816 in communication with a memory 818. The illustrated server 814 includes various functional modules. In one embodiment, these modules are contained within the memory 818 and include instructions to be operated on by the processor 816. One of ordinary skill in the art will understand that these functional modules can be formed from software, hardware, or various combinations of software and hardware.

In one embodiment, the server 814 includes a database module 820 for associating secure document data with test-taker data. One embodiment of the server includes an on-line enrollment module 822 for a test administrator to populate test-taker data through on-line communication. One embodiment of the server includes a verification module 824 for verifying received secure documents against distributed secure documents and the populated test-taker data. The verification module 824 is capable of performing other verifications to promote the integrity of the system. One embodiment of the server includes a reporting module 826 for reporting verification results from the verification module.

One embodiment of the server includes a test evaluation module 828 for processing test answers and collecting test results. One embodiment of the test evaluation module 828 includes a dealer module 830, such as that provided in the patent application entitled "System For Programmable Presentment Of Scoring Tasks To A Plurality Of Reviewers," U.S. Ser. No. 10/140,769, filed on May 7, 2002, which has been previously incorporated by reference in its entirety. The dealer module 830 distributes open-ended test items to readers 852 and for receiving test scores from readers 852. One embodiment of the test evaluation module 828 includes optical mark recognition (OMR) logic 832 for processing objective responses. In one embodiment, the reporting module 826 reports test results from the test evaluation module.

One embodiment of the server includes a tracking module 834 for tracking a location of physical secure documents. According to one embodiment, the tracking module 834 also tracks electronic files representing secure documents.

One embodiment of the server 814 includes a communication module 836 to provide on-line communication with one or more test-taking centers 812. One embodiment of the communication module 814 provides on-line enrollment communication between the test processing center 810 and the one or more test-taking centers 812. One embodiment of the communication module 836 provides precoding communication between the test processing center 810 and the one or more test-taking centers 812. One embodiment of the communication module 836 provides report communication from the test processing center 810 to the one or more test-taking centers 812. One embodiment of the communication module 836 provides communication for updating a test-taker database from the one or more test-taking centers 812.

One embodiment of the test processing center 810 includes a test assembly area 854 or areas in which the secure test documents are assembled or otherwise prepared. The test assembly area is in communication with the server 810, and in particular with the database in the server 814, such that the security data and the associated precode data are properly printed on the secured test documents and identified in the database 820.

One embodiment of the test processing center 810 includes a test distributing area 856 or areas in which the tests are distributed from the test processing center 810 to the test-taking center(s) 812. In one embodiment, the test distributing area 856 includes one or more hand-held scanners or scanner stations for reading bar codes that represent the security data and the precode data. The test distributing area 856 is in communication with the server 814, and in particular with the data base module 820 and the tracking module 834, to identify the test documents that are being shipped to the test-taking center(s). According to one embodiment, the verification module 824 verifies that the desired test documents are being distributed to the test-taking center(s). According to one embodiment, the reporting module 826 reports information regarding the shipped test documents.

One embodiment of the test processing center 810 includes a test receiving area 858 or areas in which the tests are received from the test-taking center(s) 812. In one embodiment, the test receiving area 858 includes one or more hand-held scanners or scanner stations for reading bar codes that represent the security data and the precode data. In one embodiment, the scanners acquire a scanned image of the test document for processing in the test processing area 860. The test receiving area 858 is in communication with the server 814, and in particular with the data base module 820 and the tracking module 834, to identify the test documents that are being shipped from the test-taking center(s) 812 to the test processing center 810. According to one embodiment, the verification module 824 verifies that the received test documents correspond to the distributed test documents. According to one embodiment, the reporting module 826 reports information regarding the shipped test documents. In one embodiment, the test-taker population is updated on-line through the communication module 836 so as to identify the test-takers 836 who actually completed the test documents.

One embodiment of the test processing center 810 includes a test processing area 860 or areas in which the completed test documents are evaluated. In one embodiment, the test processing area 860 includes optical mark recognition (OMR) equipment for evaluating objective questions 848. In one embodiment, the test processing area 860 includes scanners for scanning open-ended portions of the test documents to be dealt to a reader 852 and evaluated. In one embodiment, the test processing area 860 includes scanners that acquire images of both objective 848 and open-ended 850 portions of the tests. Image processing software processes the scanned images to evaluate the objective and open-ended responses.

One embodiment of the test processing center 810 includes an inventory area 862 or areas. The inventory area 810 includes a Work-In-Progress (WIP) area 864 in which test documents are grouped and stored during processing. In one embodiment, the test documents are grouped in the WIP area 864 on labeled pallets. In one embodiment, the test documents are grouped in the WIP area 864 according to a project-determined priority. The WIP area 864 is in communication with the server 814, and particularly with the tracking module 834 and the database 820 to track the location and status within the inventory area 810. The verification modules 824 is capable of verifying the progress of the test documents at various points along the process.

The inventory area 810 also includes an archive area 866. In one embodiment, the archive area 866, or a portion thereof, is located within the test processing center 810. In one embodiment, the archive area 866, or a portion thereof, is located off-site from the test processing center 810. The archive area 866 is in communication with the server 814, and particularly with the tracking module 834 and the database 820 to track the location and status within the inventory area 810. According to one embodiment, the archive area 866 stores physical documents. According to one embodiment, the archive area 866 stores electronic files of test images, test results and/or reports, and these are available for on-line retrieval. In one embodiment, the test results are retrieved by a number of persons within the test-processing center using an intranet network, for example. In one embodiment, the test results are retrieved by a customer, such as test administrators or teachers, for example.

Figure 9:
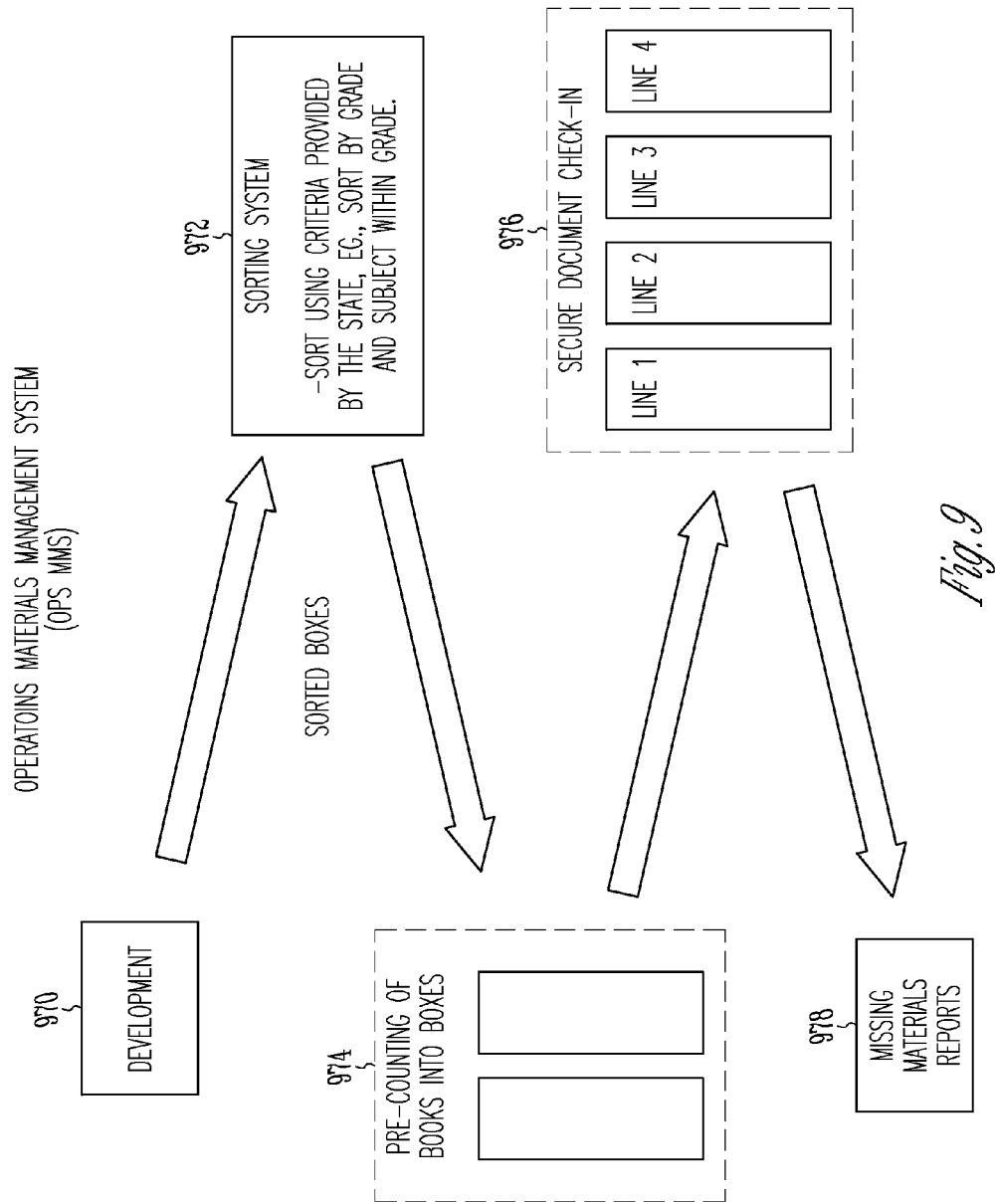
FIG. 9 illustrates a system for receiving test documents from test-taking centers.

FIG. 9 illustrates a system for receiving test documents from test-taking centers. In one embodiment, the system 958 corresponds to the receiving area 858 illustrated in FIG. 8. In one embodiment, the system 958 includes a box check-in area 970 where boxes or other containers shipped from the test-taking centers are received. One embodiment of the system verifies that the boxes shipped from the test-taking center correspond to the boxes received at the box check-in area. The boxes, and the test documents contained therein, are sorted based on projected-determined criteria at 972. For example, a state may require that the test documents are sorted by grade and subject within the grade. In one embodiment, the system performs a pre-count of the number of test documents in the sorted boxes at 974, and verifies that the count is correct. For example, the system verifies that the number of received third grade science test documents correspond to the identified number of third grade test-takers that completed the science test document. In the illustrated embodiment, the system performs a secure document check-in at 976. The illustrated embodiment indicates that various embodiments use a number of lines to check-in the secure documents. In one embodiment, the system verifies that the distributed secure test documents correspond to the received secure test documents. The system generates a missing materials report at 978 based on the verification at the secure document check-in area 976.

As has been provided above, the present subject matter provides a system for electronic tracking and control of secure test documents. The present subject matter promotes the efficiency and integrity of processes for evaluating standardized tests and reporting standardized test results. A verification process quickly determines whether a potential problems exists regarding a secure document. Test documents that are not verified are associated with test-taker data to provide meaningful information that is helpful to resolve the potential problems with the secure test documents.

This disclosure refers to several figures that resemble flow diagrams. One of ordinary skill in the art will understand, upon reading and comprehending this disclosure, that the methods related to the flow diagrams may occur in the order as illustrated in the flow diagrams, and may be ordered in another manner. Thus, the present subject matter is not limited to a particular order or logical arrangement.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A method for a test processor to track and control a plurality of secure test documents for administration to a test-taker population of individual test-takers, the method comprising:

receiving, using on-line communication, test-taker information for each of the individual test-takers to provide precode data, wherein the precode data includes information specific to each of the individual test-takers and information specific to groupings of test-takers within the test-taker population;

providing secure document data for the plurality of secure test documents, including assigning a unique identifier to each of the secure test documents to be distributed to the test-taking centers and completed by the plurality of individual test-takers at the test-taking centers, wherein the secure test documents are uniquely-identified secure test documents;

associating the precode data with the secure document data for the uniquely-identified test documents;

distributing the uniquely-identified secure test documents from the test processor to test-taking centers for administration of the uniquely-identified secure test documents to the plurality of individual test-takers;

receiving, at the test processor, the uniquely-identified secure test documents that have been administered to the test-taker population from the test-taking centers and returned to the test processor;

accounting for the uniquely-identified secure test documents to determine whether the secure test documents distributed from the test processor are received at the test processor, including verifying the uniquely-identified secure test documents received at the test processor using the secure document data and the precode data to provide verification results accounting for the uniquely-identified secure test documents distributed to the test-taking centers;

reporting the verification results for unaccounted secure test documents to an entity using the precode data for the unaccounted secure test documents, wherein the verification results include appropriate precode data to assist the entity with resolving discrepancies between the uniquely-identified secure test documents that were distributed to the test-taking centers and the uniquely-identified secure test documents returned to the test processor;

processing the received plurality of test documents, at the test processor, to determine test results; and reporting the test results using at least some information in the precode data, wherein receiving the uniquely-identified secure test documents that have been administered to the test-taker population from the test-taking centers and returned to the test processor includes:

receiving one or more boxes that contain the plurality of secure test documents;

processing the one or more received boxes, wherein processing the one or more received boxes includes verifying that the one or more received boxes correspond to one or more shipped boxes sent from the test-taking center, including:

receiving shipping data regarding the one or more shipped boxes sent from the test-taking center;

updating a database with the shipping data;

identifying a unique identifier for each of the one or more received boxes;

validating the one or more received boxes against the shipping data in the database; and updating the database to indicate whether the one or more shipped boxes sent from the test-taking center have been received at the test processing center; and processing the plurality of secure test documents contained within the one or more received boxes, including:

identifying a security data record and a precode data record on each of the plurality of secure test documents contained in the one or more received boxes; and creating one or more scanned images for each of the plurality of secure test documents such that the one or more scanned images are processed.

2. The method of claim 1, wherein distributing the uniquely-identified secure test documents includes distributing a secure test document to a student taking a home-based assessment.

3. The method of claim 1, wherein the precode data includes school data, class data and student data.

4. The method of claim 1, wherein the precode data includes test requirements for the individual test-taker.

5. The method of claim 1, wherein the uniquely-identified secure test documents distributed to the test-taking centers are printed with secure document data records such that each of the uniquely-identified secure test documents is printed with a unique secure document data record, and with a precode data record associated with the unique secure document data record.

6. The method of claim 1, further comprising using on-line communication to receive from the test-taking centers updates identifying individual test-takers who were administered the secure test-documents.

7. The method of claim 1, further comprising:

using on-line communication to receive enrollment data from the test-taking center, wherein the enrollment data includes data for enrolling test-takers to receive the secure test documents; and using the enrollment data to prepare the uniquely-identified test documents for distribution to the test-taking center.

8. The method of claim 7, wherein using the enrollment data includes sharing the enrollment data with a procurement system through a computer readable medium for ordering material to prepare the plurality of test documents.

9. The method of claim 1, wherein processing the one or more received boxes further includes reporting a status to the test-taking center regarding whether the one or more shipped boxes sent from the test-taking center have been received at the test processing center.

10. The method of claim 1, wherein processing the one or more received boxes further includes assigning the one or more received boxes to Work-In-Progress (WIP) groups.

11. The method of claim 10, wherein assigning the one or more received boxes into WIP groups includes assigning the one or more received boxes to one or more identified pallets of boxes.

12. The method of claim 1, wherein identifying a security data record and a precode data record on each of the plurality of test documents contained in the one or more received boxes includes:

reading a security bar code representing a security data record, and reading a precode bar code representing a precode data record.

13. The method of claim 1, wherein processing the plurality of test documents contained in the one or more received boxes further includes processing the one or more scanned images to score objective scoring tasks and open-ended scoring tasks.

14. The method of claim 1, wherein processing the plurality of test documents contained in the one or more received boxes further includes:
performing an optical mark recognition (OMR) process to score objective scoring tasks;
wherein creating one or more scanned images includes creating scanned images of open-ended scoring tasks for the plurality of test documents and distributing the scanned images of open-ended scoring tasks to readers for scoring.

15. The method of claim 1, wherein processing the plurality of secure test documents contained in the one or more received boxes includes:
sorting the plurality of secure test documents according to project requirements; and
processing the sorted plurality of secure test documents according to a priority established by the project requirements.

16. The method of claim 15, wherein sorting the plurality of test documents according to project requirements includes regrouping like materials in one or more labeled boxes.

17. The method of claim 15, wherein processing the sorted plurality of test documents includes:
identifying a security data record and a precode data record on each of the plurality of test documents contained in the one or more received boxes; and
verifying that the plurality of test documents were sorted according to project requirements.

18. The method of claim 15, wherein processing the sorted plurality of test documents includes providing reports for showing a status of the plurality of test documents contained in the one or more received boxes.

19. The method of claim 15, wherein processing the sorted plurality of test documents includes providing problem resolution screens for resolving discrepancies between the received plurality of test documents and the distributed plurality of test documents.

20. The method of claim 15, wherein processing the sorted plurality of test documents further includes providing user-defined queries to obtain user-desired information.

21. The method of claim 20, wherein providing user-defined queries to obtain user-desired information includes providing queries for tracking the plurality of test documents as the plurality of test documents are processed.

22. The method of claim 15, wherein processing the sorted plurality of test documents according to a priority established by the project requirements includes:
creating one or more scanned images for each of the plurality of test documents; and
processing the one or more scanned images to score objective scoring tasks and open-ended scoring tasks.

23. The method of claim 15, wherein processing the sorted plurality of test documents according to a priority established by the project requirements includes:
identifying a security data record and a precode data record on each of the plurality of test documents contained in the one or more received boxes;
performing an optical mark recognition (OMR) process to score objective scoring tasks; and
creating scanned images of open-ended portions of the plurality of test documents, and distributing the scanned images of open-ended portions to readers for scoring.

24. The method of claim 15, wherein identifying a security data record and a precode data record on each of the plurality of test documents contained in the one or more received boxes includes:
reading a security bar code representing a security data record, and
reading a precode bar code representing a precode data record.

25. The method of claim 1, further comprising archiving the plurality of test results on computer-readable media, and providing a communication module configured for on-line retrieval of the archived test results.

26. The method of claim 1, further comprising:
archiving the plurality of test documents and maintaining a database to identify a location for each of the plurality of test documents; and
providing a communication module configured for on-line retrieval of the archived test results.

* * * * *